United States Patent [19]

Becker et al.

[11] 4,356,612

[45] Nov. 2, 1982

[54] METHOD OF PRODUCING A FORGED PRODUCT

[75] Inventors: James R. Becker; Edward L. Raymond, both of Houston, Tex.

[73] Assignee: Cameron Iron Works, Inc., Houston, Tex.

[21] Appl. No.: 135,486

[22] Filed: Mar. 31, 1980

[51] Int. Cl.³ .................... B23P 15/00; B23P 13/00; B21D 31/06; B21D 51/00

[52] U.S. Cl. ................... 29/157.1 R; 29/447; 72/354; 137/375; 251/366

[58] Field of Search .......... 29/157.1 R, 447, 156.7 B, 29/157 T; 72/352, 353, 354, 358, 359; 228/155, 173 E; 137/375; 251/366

[56] References Cited

U.S. PATENT DOCUMENTS

| | | | |
|---|---|---|---|
| 1,687,646 | 10/1928 | Duncan | 29/157.1 R |
| 1,733,226 | 10/1929 | Jones | 29/157.1 R |
| 1,799,390 | 4/1931 | Porter | 29/157.1 R |
| 1,898,426 | 2/1933 | Dannell | 29/156.7 B |
| 1,960,127 | 5/1934 | Smith | 29/157.1 R |
| 2,761,205 | 9/1956 | Siklosi | 29/447 |
| 3,014,266 | 12/1961 | Samuels et al. | 29/447 |
| 3,114,203 | 12/1963 | Frank | 228/155 |
| 3,286,498 | 11/1966 | Cogan | 72/354 |
| 3,579,781 | 5/1971 | Yaegashi | 29/447 |
| 3,750,442 | 8/1973 | Cogan | 72/354 |
| 4,044,737 | 8/1977 | Nishimura | 137/375 |
| 4,161,187 | 7/1979 | Bauer | 137/375 |

FOREIGN PATENT DOCUMENTS

| | | | |
|---|---|---|---|
| 137420 | 1/1948 | Australia | 72/354 |
| 926745 | 4/1955 | Fed. Rep. of Germany | 72/354 |
| 411444 | 6/1934 | United Kingdom | 29/157.1 R |
| 164773 | 8/1964 | U.S.S.R. | 72/353 |

*Primary Examiner*—Daniel C. Crane
*Attorney, Agent, or Firm*—Vinson & Elkins

[57] ABSTRACT

An improved forged steel structure lined with a corrosion resistant metal in which the lining and body are forged together. The improved method includes the steps of securing a bar of corrosion resistant metal within an alloy steel tube to form a billet, forging the billet to the desired shape with sufficient corrosion resistant metal to line at least one of the cavities of the desired shape and machining the forging to produce the desired lined structure. The amount of alloy steel and corrosion resistant metal in the billet being preselected to provide the desired lining without substantially weakening the structure.

16 Claims, 8 Drawing Figures

METHOD OF PRODUCING A FORGED PRODUCT

BACKGROUND

Structures, such as valves and blowout preventers, which are designed to hold pressure under corrosive conditions preferably have an alloy steel exterior body for high strength and an interior lining of corrosion resistant metal. Such lining should be provided without weakening the alloy steel body, should completely cover the exposed interior and should be uniformly bonded to the body.

A stainless steel lining inserted into a valve passageway and flared at its ends is shown in U.S. Pat. No. 3,349,789. Another valve with an inserted liner is disclosed in U.S. Pat. No. 2,497,780. A lined article produced by the simultaneous extrusion of two metals in an impact die is disclosed in U.S. Pat. No. 3,648,351. Another process for extruding two metals in a single structure is disclosed in U.S. Pat. No. 2,088,223.

Prior to the present invention, lined pipe has been made by co-extruding a billet of two concentric tubes of different metals, e.g., carbon steel for the base metal and stainless steel for the lining. An extrusion process is acceptable for producing tubular elements but making structures, such as valve and blowout preventer bodies, requires complex shapes including flanges etc., rather than a straight extruded tube. Metal linings also have been deposited by welding, by electroplating and by explosion bonding.

Linings provided by bonding, such as by welding or explosive bonding, have a tendency to cause a change in the outer alloy steel body by the application of heat or explosive force so that the body may be weakened. Also, with all linings, sufficient lining material should be provided to assure a complete lining after machining.

SUMMARY

The present invention provides an improved method of producing a lined forged steel structure and the lined structure itself. The method includes the steps of forming a billet by securing a bar of corrosion resistant metal within a metallic tube, forging the billet into the desired product shape, and machining the forged product. The bar and tube sizes are so related that the machined product has sufficient alloy steel to provide the desired strength and the passages and cavities in the body are uniformly lined with the corrosion resistant metal after machining. It is preferred that the corrosion resistant metal bar be a nickel alloy or a stainless steel with exterior nickel plating. In some complicated structures, such as a blowout preventer body, a portion of the lining may be effected by this method and other portions may be lined by conventional means.

An object of the present invention is to provide an improved method of producing an alloy steel structure, such as a valve body or blowout preventer body, with a corrosion resistant lining integral with the alloy steel and formed with the forming of the alloy steel.

Another object is to provide a lined steel structure in which the steel structure is not weakened by the application of the lining.

A further object is to provide an improved method of producing an alloy steel structure lined with a corrosion resistant metal from a billet of an alloy steel tube having a corrosion resistant bar secured in and filling the bore of the tube.

Still further object is to provide an improved method of producing a structure having an alloy steel exterior and a corrosion resistant metal lining which structure has a nontubular shape.

BRIEF DESCRIPTION OF THE DRAWINGS

These and other objects and advantages are hereinafter set forth and explained with respect to the drawings wherein.

DESCRIPTION OF THE PREFERRED EMBODIMENTS

Figure 1:
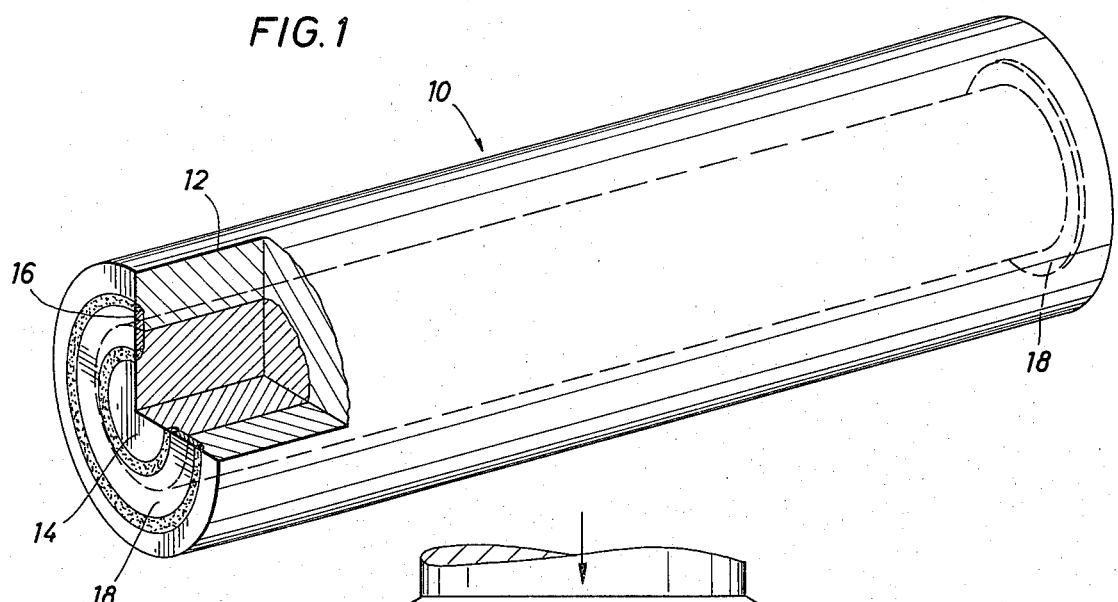
FIG. 1 is a diametric projection of a fabricated billet with portions broken away to illustrate the securing of the bar within the tube.

Billet 10 as shown in FIG. 1 comprises outer tube 12, preferably alloy steel (4130) and bar 14 of a corrosion resistant metal, preferably nickel alloy steel, secured within the bore of tube 12. If desired, bar 14 may be a 316 stainless steel which is nickel plated on its exterior surface. The nickel alloy or plating improves the bond continuity between the bar and tube after forging by avoiding the development of a hard brittle chrome alloy at the interface. Nickel alloys, such as inconel and monel, do not require the nickel plating but it is believed that such plating is advantageous. Other combinations of metals which may be used in forming billet 10 include tantalum, Hastelloy Alloys, copper, copper alloys and titanium bonded to various grades of alloy, carbon or stainless steel.

Tube 12 may be heated in a 600° F. furnace for approximately one and one-half hours for ease of insertion of bar 14 therein. Tube 12 is allowed to cool and shrink into a tight fit around bar 14. The faces of tube 12 and bar 14 are machined to provide grooves 16 in the ends of billet 10 inside and outside the joints between tube 12 and bar 14. Rings 18 are positioned in grooves 16 and welded therein. The tight assembly of bar 14 in tube 12 and the welding of rings 18 over the end joint between bar 14 and tube 12 secure bar 14 therein.

As an example, to produce a valve body in accordance with the present invention with a finished flow passage of 6.375 inches, a flange-to-flange dimension of 32 inches and a 10,000 psi pressure rating, it is preferred that outer tube 12 may have a diameter of 12 inches and a bore of 6.5 inches, and bar 14 a diameter of 6.5 inches and billet 10 a length of 72 inches.

Figure 2:
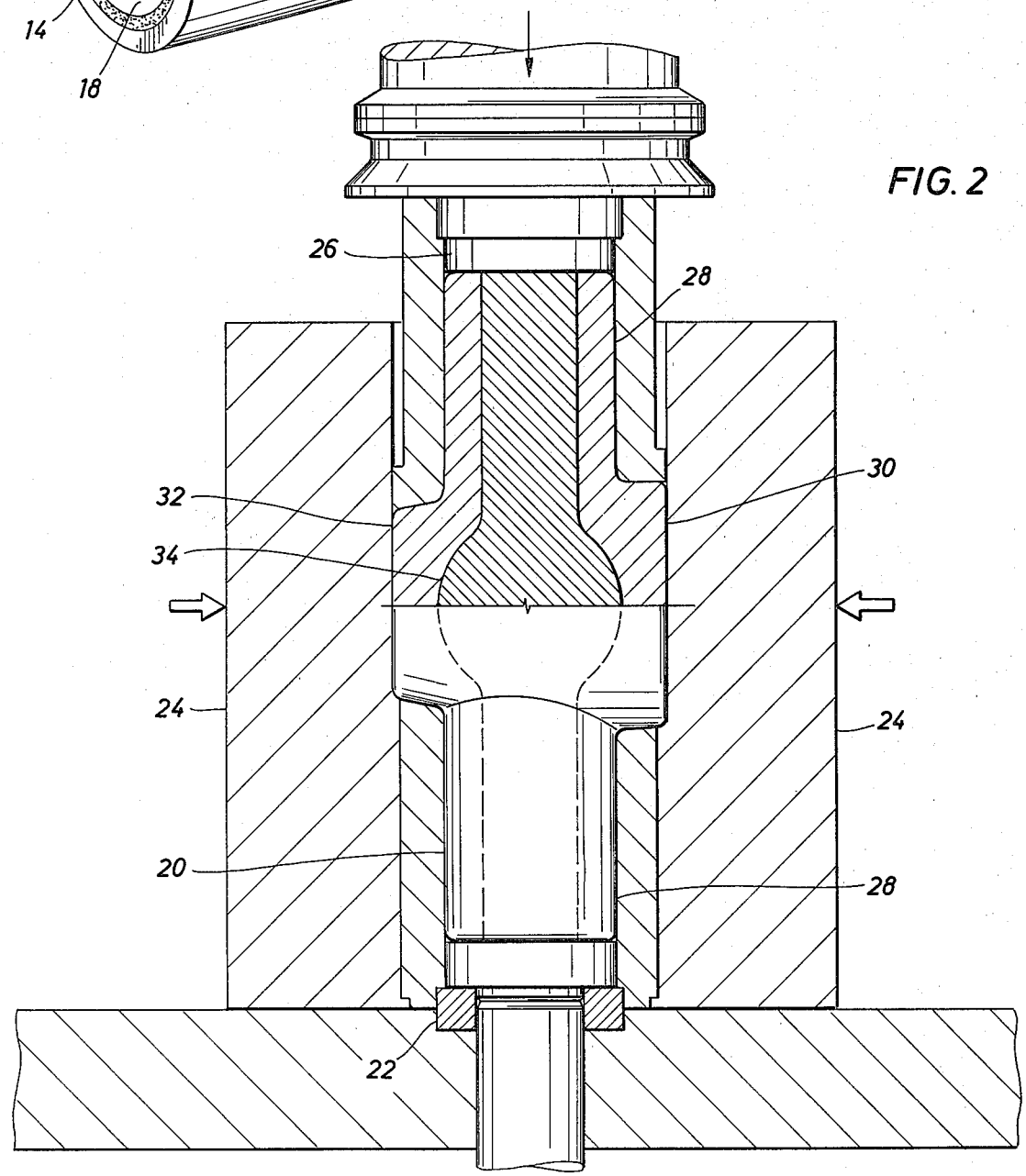
FIG. 2 is a sectional view illustrating the forging of the blocker from the fabricated billet and the effect on the shape of the internal corrosion resistant bar.

Using fabricated billet 10, blocker 20 is produced by forging as shown in FIG. 2. Normally, billet 10 is supported on lower ram 22 while side rams 24 move inwardly and upper ram 26 moves downwardly. In the above example, starting with a billet 12 inches in diameter and 72 inches long, blocker 20 has an overall length of 47.22 inches, body sides 28 have an outer diameter of 12.62 inches, upper projection 30 has a diameter of 17.38 inches, lower projection 32 has a diameter of 13.96 inches and the depth across projections 30 and 32 is 19.62 inches. Also, the forging step has caused the central portion of bar 14 to enlarge as shown at 34.

Figure 3:
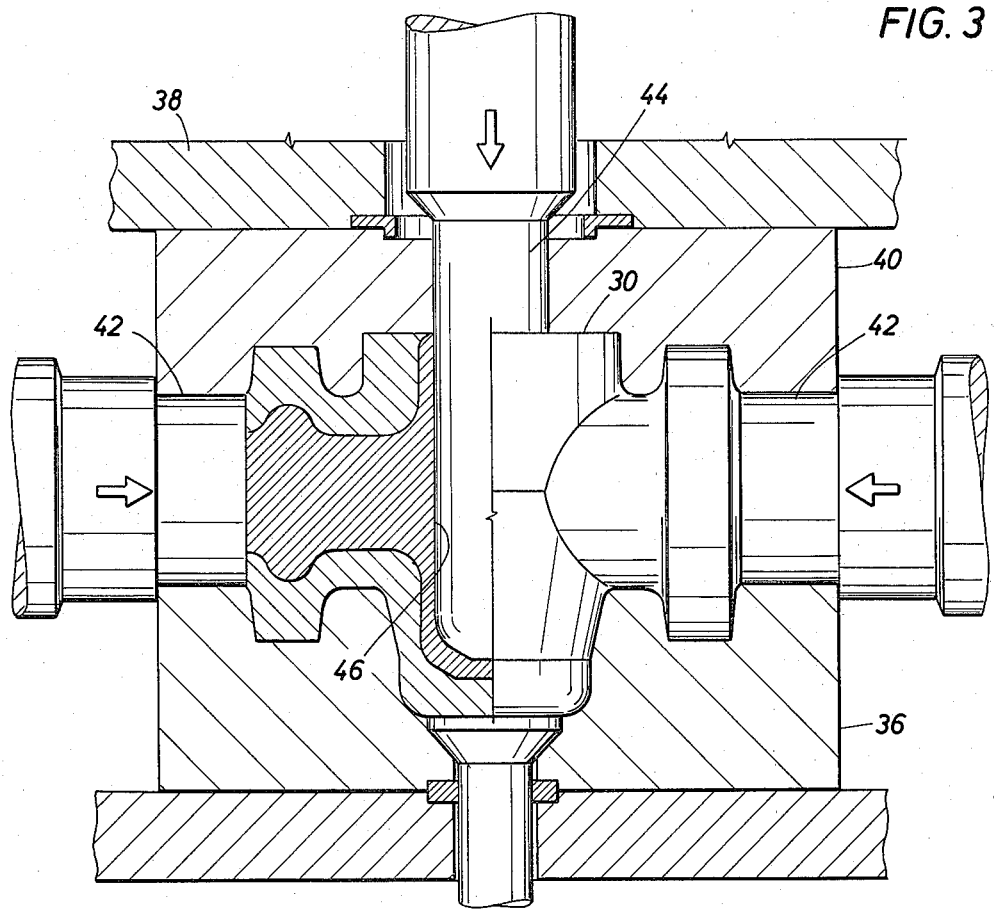
FIG. 3 is a sectional view illustrating the forging of the blocker into a forged valve body.

Blocker 20 is heated to a temperature of approximately 2200° F. and the dies are heated to a minimum temperature of 500° F. With the dies properly lubricated, blocker 20 is placed in bottom die 36 with upper projection 30 facing upward. Main ram 38 is closed and full load applied to bring top die 40 onto blocker 20 and partially form it. Then side punches 42 are moved inward to the position shown in FIG. 3 and held in such position. Upper punch 44 is then actuated to form a cavity or valve chamber 46.

Figure 4:
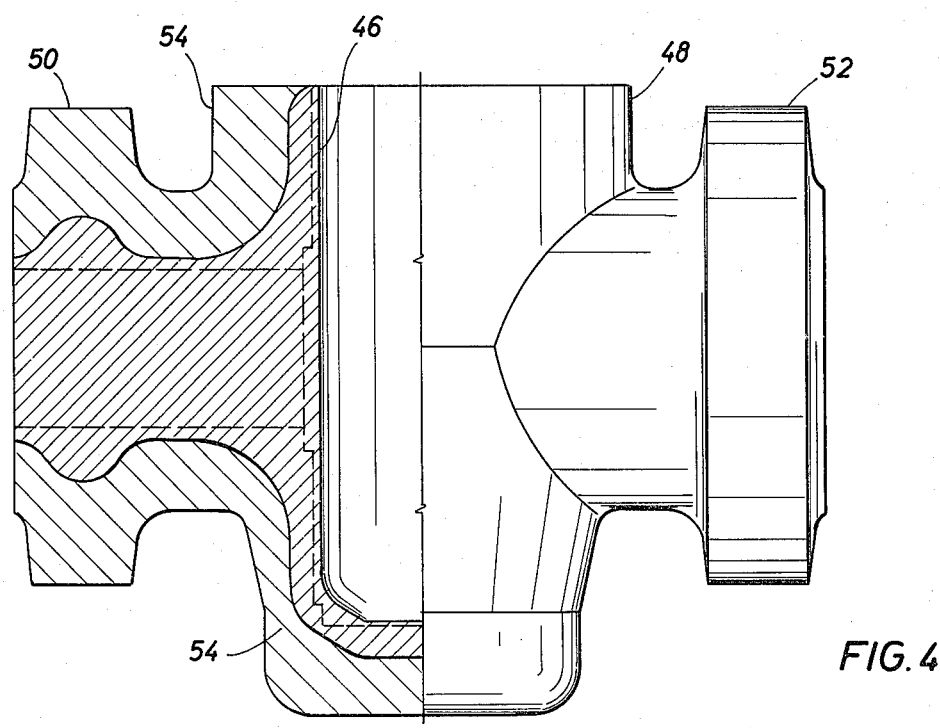
FIG. 4 is an elevation view, partly in section of the forged valve body with the finished machined surfaces shown by dashed lines.
Figure 5:
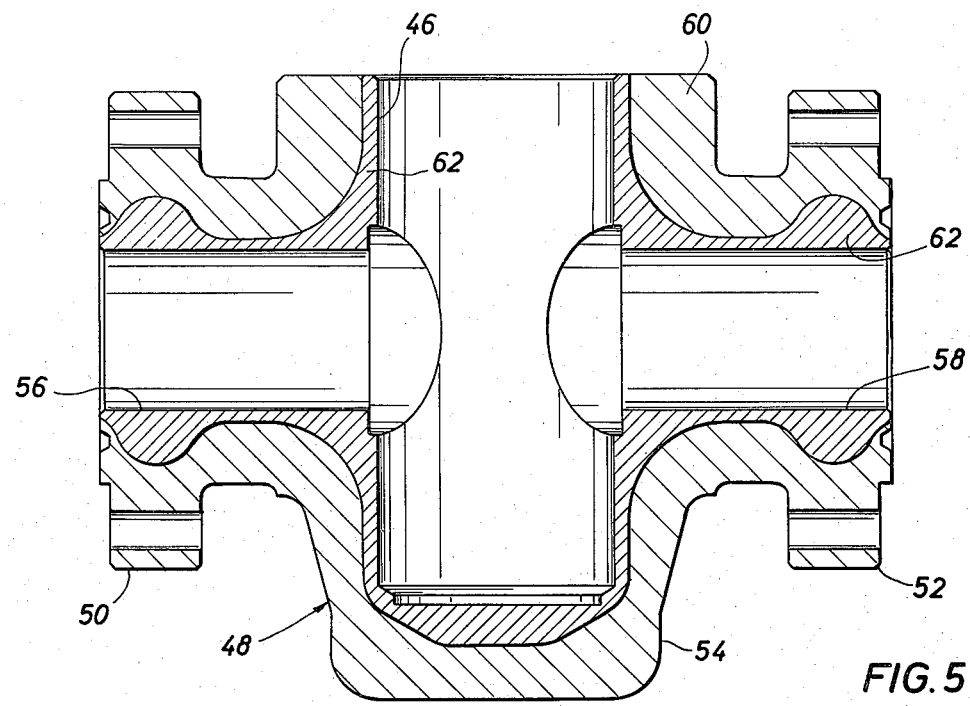
FIG. 5 is a sectional view of the machined valve body.

Resulting valve body 48, as shown in FIG. 4, has end flanges 50 and 52 and central enlargement 54 surrounding valve chamber 46. The machined surfaces within valve body 48 are shown as dashed lines in FIG. 4. From this, it may be seen that the material of bar 14 lines substantially all of the passages and cavities. Valve body 48, shown in FIG. 5, illustrates the product completely machined. Body 48 includes machined passages 56 and 58 and valve chamber 46 formed in outer body 60. Body 60 is alloy steel and lining 62 is a corrosion resistant metal, such as nickel alloy. When properly forged, lining 62 is integrally bonded to outer body 60 and does not materially reduce the strength of body 60.

Figure 6:
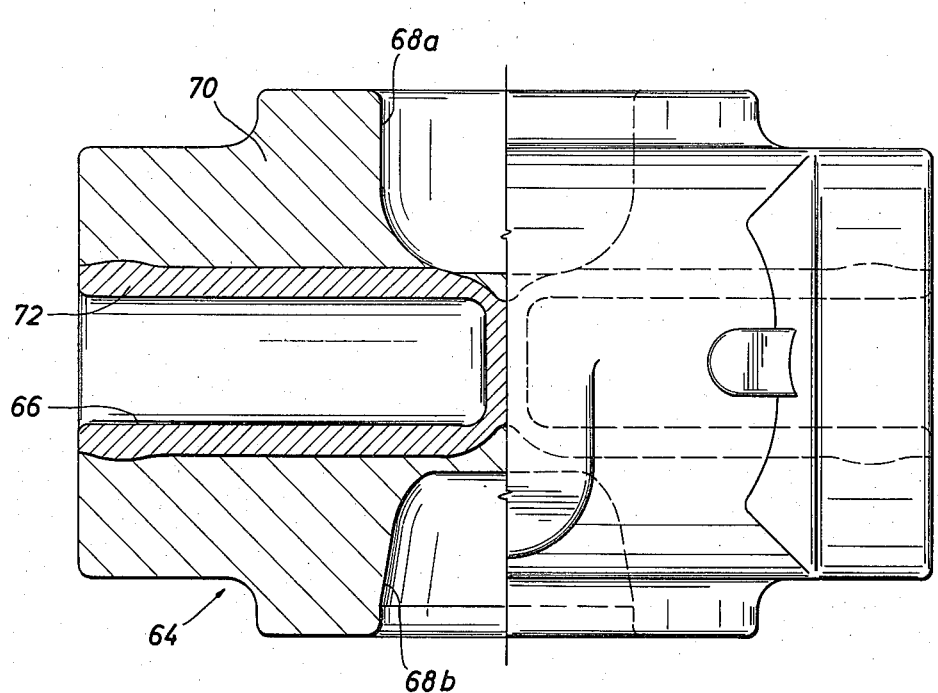
FIG. 6 is an elevation view partly in section of a forged blowout preventer body with dashed lines indicating the machined surfaces.
Figure 7:
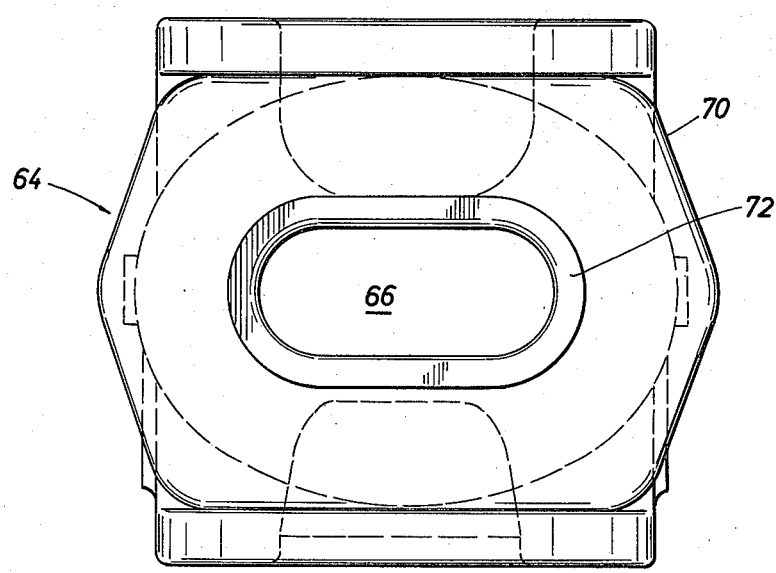
FIG. 7 is an end elevation view of the body shown in FIG. 6.

Other structures, such as blowout preventer body forging 64 shown in FIGS. 6 and 7 as a completed forging, may be produced by the present invention. The forging steps for producing forging 64 are similar to those previously described for valve body 48 except that the side punches enter and partially form ram guideways 66 and vertical bore 68 is partially formed by top and bottom openings 68a and 68b, as shown. Vertical bore 68 is completed by cutting out the excess material. Forging 64 includes exterior shell 70 of alloy steel and lining 72 of corrosion resistant metal in guideways 66 but no lining in vertical bore 68.

Figure 8:
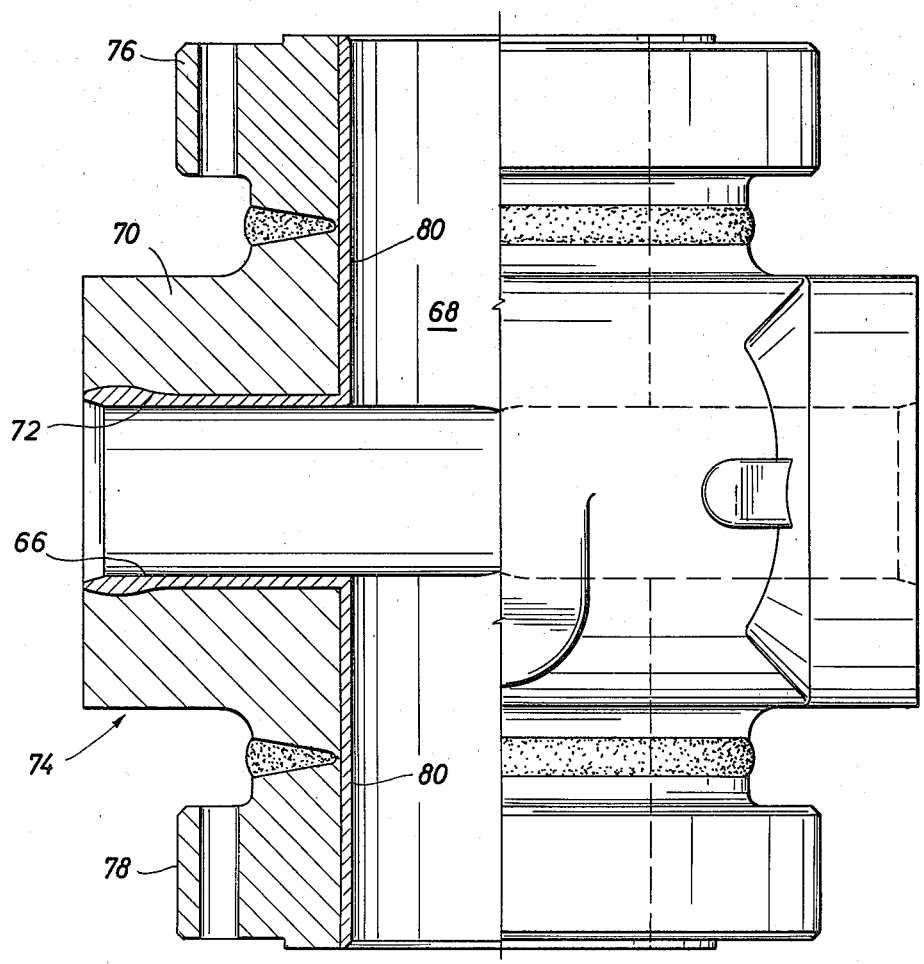
FIG. 8 is an elevation view, partly in section, of the complete blowout preventer body.

Blowout preventer body 74 is shown in FIG. 8 completed with upper flange 76 and lower flange 78 welded to body 74 and vertical bore 68 extending therethrough. Vertical bore 68 is suitably lined with corrosion resistant liner 80 which may be applied by any suitable process, such as welding. Body 74 has alloy steel shell 70 with corrosion resistant metal lining 72 in guideways 66. The forging 64 is formed from a fabricated billet (not shown) similar to billet 10 of FIG. 1 with the relative dimensions of the bar and tube being preselected to assure sufficient alloy steel for shell 70 to provide the desired pressure rating and sufficient corrosion resistant material to line guideways 66 after machining.

In the method of making both valve bodies and blowout preventer bodies, the forging includes a step of forming a transverse cavity which is lined. As used, transverse means that the axis of the cavity is transverse to the major bore or flow passage through the device formed. In a valve body the transverse cavity is the valve chamber and in a blowout preventer the cavity are the lined guideways.

What is claimed is:

1. The method of producing a metallic body having a plurality of intersecting cavities lined with a corrosion resistant metal material including the steps of securing a bar of corrosion resistant material within a metallic tube to form a bimetallic billet, processing the billet in a series of forging steps to the desired shape, whereby said tube is formed to said body with a plurality of intersecting cavities and said bar is formed simultaneously to line all of said cavities with a passage formed in at least one cavity and machining at least another one passage in said body to form a body with lined intersecting passages, the size of the corrosion resistant bar in said billet being sufficiently large to line the cavities of the metallic body with enough material to permit said machining step.

2. The method according to claim 1 including the step of machining the forged billet to produce the finished metallic body and the lined cavities therein.

3. The method according to claim 1 wherein said forging step includes at least one cavity forming step.

4. The method according to claim 1 wherein the metallic body produced is a valve body.

5. The method according to claim 1 wherein the metallic body produced is a blowout preventer body.

6. The method according to claim 1 wherein the material of said tube is an alloy steel, and the material of said bar is a nickel alloy.

7. The method according to claim 1 wherein the material of said tube is an alloy steel, and the material of said bar is a nickel plated stainless steel.

8. The method according to claim 1 wherein said securing step includes welding a ring to each end of said tube and said bar in covering relationship to their intersection.

9. The method of producing a lined valve body having a valve chamber and flow passages communicating with said chamber including the steps of securing a corrosion resistant metal bar tightly within a metal tube to form a billet, processing the billet to the valve body shape in a series of forging steps, said forging steps including forming the valve chamber and a cavity filled with a quantity of bar material for forming flow passages within the body and simultaneously forming the corrosion resistant metal of said bar to substantially line the valve chamber, and machining said filled cavity to form flow passages in the valve body, the material of said bar being of sufficient volume to substantially fully line said passages after said machining step.

10. The method of producing a ram type blowout preventer body having a central bore and guideways extending from said bore including the steps of securing a corrosion resistant metal bar tightly within a metal tube to form a billet, processing the billet to the blowout preventer body shape in a series of forging steps, said forging steps including a cavity forming step whereby the central bore and the guideways are formed, while simultaneously forming said bar to line said guideways, machining said body to form passages in said guideways, the material of said bar being of sufficient volume to substantially fully line said guideways after said machining step, cutting a vertical bore through said central bore, welding upper and lower flanges to said body around said vertical bore, and applying a corrosion resistant metal lining to the walls of said vertical bore thereby forming a lined central bore and lined guideways.

11. The method of producing a metallic body having a non uniform section including the steps of selecting a corrosion resistant metallic bar of desired dimensions, plating the bar with nickel, selecting a tube of desired dimensions and of substantially the same inner dimension as the outer dimension of said bar, heating the tube, inserting the bar into the heated tube, allowing the tube to cool and shrink tightly onto the bar to form a billet, cutting grooves in the ends of the billet inside and outside of the joints between the bar and the tube, welding rings into said grooves to seal the ends of the joints, heating the billet to forging temperatures, forging the billet to form a blocker, forging said blocker to the desired body shape, said step of forging said blocker including a body forming step, a cavity forming step, and simultaneously forming the bar to line said cavity, and machining said body thereby forming lined passages, the material of said bar being sufficient to substantially fully line said cavity after said machining step.

12. The method of producing a metallic body having a non-uniform section with a plurality of intersecting cavities including the steps of selecting a corrosion resistant metallic bar of desired dimensions, plating the bar with nickel, selecting a tube of desired dimensions and of substantially the same inner dimension as the outer dimension of said bar, heating the tube, inserting the bar into the heated tube, allowing the tube to cool and shrink tightly onto the bar to form a billet, cutting grooves in the ends of the billet inside and outside of the joints between the bar and the tube, welding rings into said grooves to seal the ends of the joints, heating the billet to forging temperatures, and processing the billet after said heating step in a series of forging steps to form the desired body with its cavities and simultaneously forming said bar to completely line at least one cavity and forming a chamber therein, and machining said forged billet to form a second passage intersecting with said chamber thereby forming a lined chamber intersecting with a lined passage.

13. The method of producing a lined valve body having a body cavity and flow passages, including the steps of selecting a corrosion resistant metallic bar of desired dimensions, plating the bar with nickel, selecting a tube of desired dimensions and of substantially the same inner dimension as the outer dimension of said tube, heating the tube, inserting the bar into the heated tube, allowing the tube to cool and shrink tightly onto the bar to form a billet, cutting grooves in the ends of the billet inside and outside of the joints between the bar and the tube, welding rings into said grooves to seal the ends of the joints, heating the billet to forging temperatures, forging the billet to form a blocker, forging said blocker to the desired valve body shape with a body cavity and flow passage cavities while simultaneously forming said bar into position to line the body cavity and cavities filled with bar material for forming flow passages, said step of forging said blocker including a cavity forming step, and machining said body cavity and said filled cavities to form flow passages in said body, the material of said bar being of sufficient volume to substantially fully line said cavity and said flow passages after said machining step.

14. The method of producing a ram type blowout preventer body including the steps of selecting a corrosion resistant metallic bar of desired dimensions, plating the bar with nickel, selecting a tube of desired dimensions and of substantially the same inner dimension as the outer dimension of said tube, heating the tube, inserting the bar into the heated tube, allowing the tube to cool and shrink tightly onto the bar to form a billet, cutting grooves in the ends of the billet inside and outside of the joints between the bar and the tube, welding rings into said grooves to seal the ends of the joints, heating the billet to forging temperatures, forging the billet to form a blocker, forging said blocker to the desired body shape, said step of forging said blocker including a cavity forming step whereby the guideways are formed and simultaneously forming said bar to line said guideways, and machining said guideways to form passages therein, the material of said bar being sufficient to substantially fully line said guideways after said machining step.

15. The method of producing a lined body having a plurality of cavities including the steps of selecting a corrosion resistant metallic bar of desired dimensions, plating the bar with nickel, selecting a tube of substantially the same length as said bar, of desired outer dimension and of substantially the same inner dimension as the outer dimension of said bar, heating the tube, inserting the bar in the hot tube, allowing the tube to cool and shrink tightly onto the bar to form a billet, cutting grooves in the ends of the billet overlapping the bar and the tube, welding sealing rings into said grooves, heating the billet to forging temperature,
forging the billet to form a blocker,
forging said blocker to the desired body shape with a plurality of cavities while simultaneously forming said bar to line said cavities,
said step of forging said blocker including a transverse cavity-forming step, and
machining said lined cavities to form passages therein,
the material of said bar being sufficient to substantially fully line said cavity after said machining step.

16. The method of producing a lined valve body having a cavity and flow passage including the steps of
selecting a corrosion resistant metallic bar of desired dimensions,
plating the bar with nickel,
selecting a tube of substantially the same length as said bar, of desired outer dimension and of substantially the same inner dimension as the outer dimension of said bar,
heating the tube,
inserting the bar in the hot tube,
allowing the tube to cool and shrink tightly onto the bar to form a billet,
cutting grooves in the ends of the billet overlapping the bar and the tube,
welding sealing rings into said grooves,
heating the billet to forging temperature,
forging the billet to form a blocker,
forging said blocker to the desired body shape having a cavity and flow passage cavity while simultaneously forming said bar to line said cavity and said flow passage cavity,
said step of forging said blocker including a cavity-forming step, and
machining said lined cavities to form flow passages therein.
the material of said bar being sufficient to substantially fully line said cavity and said flow passage after said machining step.

* * * * *

UNITED STATES PATENT AND TRADEMARK OFFICE
CERTIFICATE OF CORRECTION

PATENT NO. : 4,356,612

DATED : November 2, 1982

INVENTOR(S) : James R. Becker et al

It is certified that error appears in the above—identified patent and that said Letters Patent is hereby corrected as shown below:

On the title page Inventors should read

-- James R. Becker, Houston, Texas
Edward L. Raymond, Houston, Texas
Ray D. Avery, Houston, Texas
Ross D. Randall, Houston, Texas
Joe P. Parris, Magnolia, Texas --

Signed and Sealed this

Fifth Day of June 1984

[SEAL]

Attest:

GERALD J. MOSSINGHOFF

Attesting Officer     Commissioner of Patents and Trademarks